United States Patent
Corbett et al.

(10) Patent No.: US 7,130,586 B2
(45) Date of Patent: Oct. 31, 2006

(54) USING DIRECTIONAL ANTENNAS TO MITIGATE THE EFFECTS OF INTERFERENCE IN WIRELESS NETWORKS

(75) Inventors: Christopher J. Corbett, Issaquah, WA (US); Warren V. Barkley, Millcreek, WA (US); Amer Aref Hassan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 628 days.

(21) Appl. No.: 10/449,451

(22) Filed: May 30, 2003

(65) Prior Publication Data

US 2004/0242274 A1 Dec. 2, 2004

(51) Int. Cl.
H04B 1/00 (2006.01)
H04B 15/00 (2006.01)

(52) U.S. Cl. .................. 455/63.4; 455/562.1; 455/561; 455/456.1

(58) Field of Classification Search .............. 455/63.4, 455/562.1, 404.2, 561, 456.1
See application file for complete search history.

(56) References Cited

U.S. PATENT DOCUMENTS

| | | | | |
|---|---|---|---|---|
| 5,835,859 | A * | 11/1998 | Doner | 455/447 |
| 6,006,096 | A * | 12/1999 | Trompower | 455/456.2 |
| 2004/0002357 | A1 * | 1/2004 | Benveniste | 455/550.1 |
| 2004/0166881 | A1 * | 8/2004 | Farchmin | 455/457 |
| 2004/0204114 | A1 * | 10/2004 | Brennan et al. | 455/562.1 |
| 2004/0224637 | A1 * | 11/2004 | Silva et al. | 455/63.4 |
| 2004/0242273 | A1 * | 12/2004 | Corbett et al. | 455/562.1 |
| 2005/0181723 | A1 * | 8/2005 | Miller et al. | 455/12.1 |

OTHER PUBLICATIONS

"The 5-Up Protocol for Unified Multiservice Wireless Networks" Bill McFarland, Greg Chesseon, Carl Temme, and Teresa Meng, Atheros Communications, Inc. Wireless Local Area and Home Networks 2001 IEEE, Nov. 2001 pp. 74-80.

"Adaptive QoS for Wireless Multimedia Networks Using Power Control and Smart Antennas" Alejandra Mercado and K.J. Ray Liu IEEE 2002, vol. 51, No. 5, Sep. 2002 pp. 1223-1233.

* cited by examiner

Primary Examiner—Matthew D. Anderson
Assistant Examiner—Tuan Pham
(74) Attorney, Agent, or Firm—Workman Nydegger

(57) ABSTRACT

The principles of the present invention provides for using directional antennas to mitigate the effects of interference in a wireless network. An antenna device includes an omni-directional antenna and at least one directional antenna. Each directional antenna (e.g., an electronically steered phased array antenna) can have one or more feeds for directing beams at wireless devices. The antenna device utilizes the omni-directional antenna to send and receive control data that facilitates locating wireless devices and determining when a wireless device is to send program data to or receive program data from the antenna device. The antenna device utilizes directional antennas to send program data to and receive program data from wireless devices. Since directional antennas use directional beams, directional antennas can be tuned channels with reduced interference based on the location of wireless devices relative to the antenna device.

42 Claims, 4 Drawing Sheets

USING DIRECTIONAL ANTENNAS TO MITIGATE THE EFFECTS OF INTERFERENCE IN WIRELESS NETWORKS

BACKGROUND OF THE INVENTION

1. The Field of the Invention

The present invention relates to wireless networks, and more specifically, to using directional antennas to mitigate interference in wireless networks.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form both wired and wireless computer networks over which the computer systems can communicate electronically to share data. As a result, many tasks performed at a computer system (e.g., voice communication, accessing electronic mail, electronic conferencing, web browsing) include electronic communication with one or more other computer systems via wired and/or wireless computer networks.

For example, a number of computer systems can be coupled to a data hub through corresponding wired connections (e.g., category 5 cable) to form a wired network (e.g., an Ethernet segment). Similarly, a number of wireless computer systems (commonly referred to as "stations") can be coupled to a wireless access point ("AP") through corresponding wireless connections (e.g., resulting from appropriate communication between radio transmitters and receivers) to form a wireless network (e.g., an IEEE 802.11 network). Further, a data hub and/or an AP can be connected to other data hubs, APs, or other network devices, such as routers, gateways, and switches to form more complex networks (including both wired and wireless connections).

When computer systems communicate electronically, electronic data will often pass through a protocol stack that performs operations on the electronic data (e.g., packetizing, routing, flow control). The Open System Interconnect ("OSI") model is an example of a networking framework for implementing a protocol stack. The OSI model breaks down the operations for transferring electronic data into seven distinct "layers," each designated to perform certain operations in the data transfer process. While protocol stacks can potentially implement each of the layers, many protocol stacks implement only selective layers for use in transferring electronic data across a network.

When data is received from a network it enters the physical layer and is passed up to higher intermediate layers and then eventually received at an application layer. The physical layer, the lower most layer, is responsible for converting electrical impulses, light, or radio waves into a bit stream and vice versa. On the other hand, when data is transmitted from a computer system, it originates at the application layer and is passed down to intermediate lower layers and then onto a network. The application layer, the upper most layer, is responsible for supporting applications and end-user processes, such as, for example, electronic conferencing software, electronic mail clients, web browsers, etc.

An intermediate layer incorporated by most protocol stacks is the Data Link layer. The Data Link layer decodes data packets (received from higher layers) into bit streams for use by the physical layer and encodes bit steams (received from the physical layer) into data packets for use by higher layers. A sub-layer typically included in the Data Link layer is the Media Access Control ("MAC") layer, which implements protocols for moving data packets onto a shared channel (e.g., an Ethernet segment or an IEEE 802.11 channel).

However, to access a medium a computer system must be able to sense the medium. In a wireless environment, sensing a wireless medium (e.g., an IEEE 802.11 channel) can be difficult, and at times impossible, depending on how a station and an access point are physically separated. Access points typically include an omni-directional antenna that essentially results in spherical region around the access point. When a station is within a particular range of the access point (e.g., within the spherical region), the omni-directional antenna enables the access point to meaningfully send data to and receive data from the station. That is, within the particular range, transmitted radio signals have sufficient signal strength such that a physical layer can convert the radio signals into a bit stream.

Many wireless devices communicate in unlicensed frequency bands (e.g., in the 2.4 GHz band). Communication between wireless devices operating in unlicensed bands can be degraded do to transmissions from other devices that operate in the same unlicensed band. For example, some cordless telephones, some microwaves, BlueTooth devices, a wide variety of control devices, and IEEE 802.11b devices all operate in the 2.4 GHz band. Thus, cordless phones, microwaves, BlueTooth devices, and control devices (hereinafter referred to as "interfering devices") can interfere with communication between an IEEE 802.11b station and an IEEE 802.11b access point.

IEEE 802.11b effectively has three channels that can be used for communication between an IEEE 802.11b access point and IEEE 802.11b station. Thus, when there is increased interference one IEEE 802.11b channel, interference can potentially be reduced by switching to another IEEE 802.11b channel. However, since there are effectively only three channels, it is often difficult, if not impossible, to find a channel that has reduced interference at every location within a spherical region surrounding an IEEE 802.11b access point. A first channel may have increased interference on one direction, a second channel may have increased interference in a second direction, and a third channel may have increased interference in a third direction. Unfortunately, as typically implemented an omni-directional antenna can only be tuned to one channel at a time. Thus, if an IEEE 802.11b station is located in each of the first, second, and third directions, there would be virtually no way for an omni-directional antenna to select a channel such that each IEEE 802.11b station could communicate with reduced interference.

Interference from interfering devices can degrade the speed and reliability of data transferred between an IEEE 802.11b station and an IEEE 802.11b access point. For example, interference from an interfering device at or near an IEEE 802.11b station can cause the IEEE 802.11b station to communicate at a significantly reduced data rate (and, if the interfering device has high gain, potentially make communication impossible). Further, when an interfering device is at or near an IEEE 802.11b access point, communication with a number of associated IEEE 802.11b stations can be degraded. Signal degradation due to interference may result in an omni-directional antenna being able to detect that radio waves are being received but may make it impossible to determine what data is being represented by the radio waves.

That is, a physical layer may not be able to generate a bit stream from the degraded radio waves. Therefore systems, methods, and computer program products for mitigating the effects of interference during wireless communication would be advantageous.

BRIEF SUMMARY OF THE INVENTION

The foregoing problems with the prior state of the art are overcome by the principles of the present invention, which are directed towards methods, systems, and computer program products for using directional antennas to mitigate the effects of interference in wireless networks. An antenna device includes an omni-directional antenna and at least one directional antenna. Each directional antenna (e.g., an electronically steered phased array antenna) can have one or more feeds for directing beams to wireless devices. The antenna device can be an access point computer system that provides wireless devices with access to a network, such as, for example, to a Local Area Network or even to the Internet.

The omni-directional antenna receives a data notification signal from a wireless device. The data notification signal represents that the wireless device has program data to send to the antenna device. The antenna device detects the usage of a frequency spectrum in the direction of the wireless device. For example, the antenna device may detect usage in a 2.4 GHz spectrum or a 5 GHz spectrum in the direction of the wireless device The antenna device selects a channel in the frequency spectrum for use in receiving program data from the wireless device based on the results of the detection of current usage. For example, based on detection of current usage, the antenna device can select a wireless channel that has reduced interference. When appropriate, a directional beam from a directional antenna is directed towards the wireless device. The antenna device uses the directional antenna to receive program data from the wireless device on the selected channel in response to having received the data notification signal.

When the antenna device has program data to send to a wireless device, the omni-directional antenna transmits a location request that requests the location of a wireless device. The omni-directional antenna receives a corresponding location signal, which indicates the location of the wireless device, from the wireless device. The antenna device detects the usage of a frequency spectrum in the direction of the wireless device. The antenna device selects a channel in the frequency spectrum for use in sending program data to the wireless device based on the results of the detection of current usage. When appropriate, a directional beam from a directional antenna is directed towards the wireless device. The antenna device uses the directional antenna to send program data to the wireless device on the selected channel in response to having received the location signal.

Since directional antennas use directional beams, a wireless channel can be selected to mitigate interference in the direction of a wireless device. Thus, communication is not limited to a channel used by the omni-directional antenna. Further, when a new wireless device is to communicate with the antenna device, current usage of a frequency spectrum in the direction of the new wireless device can be calculated and a new channel potentially selected. Accordingly, the antenna device can select channels to mitigate interface with different wireless devices located in different directions from the antenna device.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
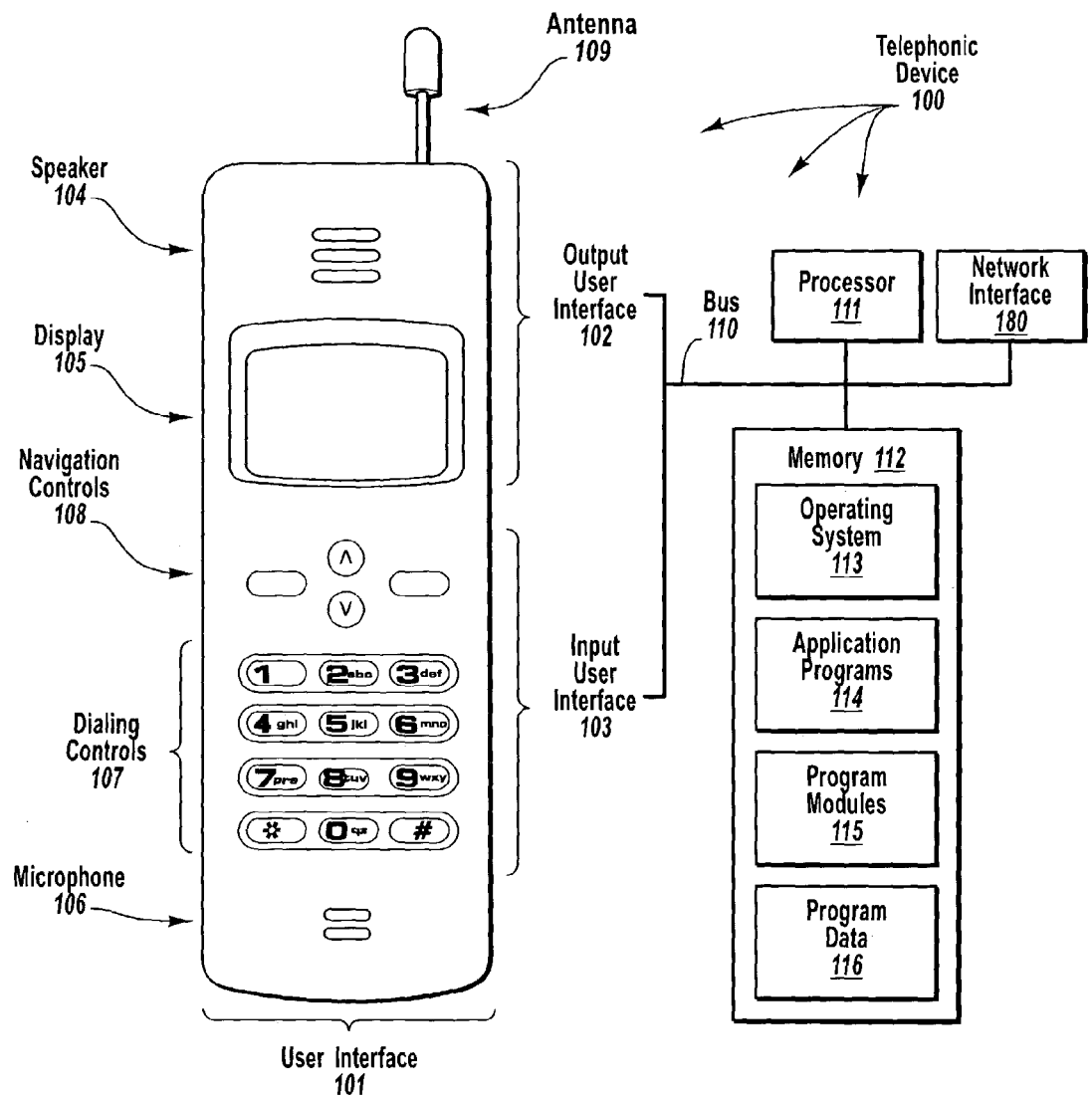
FIG. 1 illustrates a suitable operating environment for the principles of the present invention.

The principles of the present invention provide for using directional antennas to mitigate the effects of interference in a wireless network. An antenna device includes an omni-directional antenna and at least one directional antenna. Each directional antenna (e.g., an electronically steered phased array antenna) can have one or more feeds for directing beams to wireless devices. The antenna device can be an access point computer system that provides wireless devices with access to a network, such as, for example, a Local Area Network or even the Internet.

The antenna device utilizes the omni-directional antenna to send and receive control data that facilitate locating wireless devices and determining a wireless device is ready to send program data to and/or receive program data from the antenna device. The antenna device utilizes directional antennas to send program data to and receive program data from wireless devices. Since directional antennas use directional beams, directional antennas can be tuned channels with reduced interference based on the location of wireless devices relative to the antenna device.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable or computer-readable instructions comprise, for example, instructions and data which cause a general-purpose computer system or special-purpose computer system to perform a certain function or group of functions. The computer-executable or computer-readable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware modules of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a processor and memory) work together to perform operations on electronic data.

In this description and in the following claims, "control data" is defined as data that can be used to control the operation of an antenna device. Control data includes antenna commands, data notification signals, location requests, and location signals.

In this description and in the following claims, "program data" is defined as data that is not associated with the control of an antenna device. Program data includes Web data, file transfer data, streaming audio/video ("A/V") data, or other information that may be exchanged between applications. Program data may be associated with more restrictive transmission requirements, such as, for example, increased bandwidth requirements, increased reliability, and reduced latency, relative to control data. Program data can be sent and/or received using a wide range of protocols, such as, for example, Internet Protocol ("IP") and Transmission Control Protocol ("TCP").

Those skilled in the art will appreciate that the invention may be practiced in network computing environments with many types of computer system configurations, including hubs, routers, wireless access points ("APs"), wireless stations, personal computers, laptop computers, hand-held devices, multi-processor systems, microprocessor-based or programmable consumer electronics, network PCs, mini-computers, mainframe computers, mobile telephones, PDAs, pagers, and the like. The invention can also be practiced in distributed system environments where local and remote computer systems, which are linked (either by hardwired, wireless, or a combination of hardwired and wireless connections) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a telephonic device 100. Telephonic device 100 includes a user interface 101 for allowing a user to input information through an input user interface 103, and review information presented at an output user interface 102. For example, the output user interface 102 includes a speaker 104 for presenting audio information to the user, as well as a display 105 for presenting visual information to the user. Although not required, telephonic device 100 may also have an antenna 109.

The input user interface 103 may include a microphone 106 for inputting audio information into telephonic device 100. In addition, the input user interface 103 includes dialing controls 107 represented by 12 buttons through which a user may enter information. Input user interface 103 also includes navigation control buttons 108 that assist the user in navigating through various entries and options listed on display 105.

Although the user interface 101 has the appearance of a mobile telephone, the unseen features of the user interface 101 may allow for complex and flexible general-purpose processing capabilities. For example, the telephonic device 100 also includes processor 111, network interface 180, and memory 112 that are connected to each other and to the user interface 101 via system bus 110. The memory 112 generally represents a wide variety of volatile and/or non-volatile memories and may include types of memory previously discussed. However, the particular type of memory used in the telephonic device 100 is not important to the present invention. Program code means comprising one or more program modules may be stored in memory 112. The one or more program modules may include an operating system 113, one or more application programs 114, other program modules 115, and program data 116.

Telephonic device 100 is connectable to networks, such as, for example, an office-wide or enterprise-wide computer network, an intranet, and/or the Internet. Telephonic device 100 can wirelessly exchange data with external sources, such as, for example, remote computer systems and/or remote databases over such a network. Telephonic device 100 includes network interface 180 that can, when appropriate, interoperate with antenna 109 to receive data from external sources and/or transmit data to external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

For example, embodiments of the present invention may also be practiced with a laptop computer. The laptop computer can include a user input interface that receives information from an input device such as, for example, a keyboard, microphone, or mouse. The laptop computer can also include a video output interface that provides a video output signal to an integrated or external video display device, such as, for example, a color or monochrome computer monitor. The laptop computer can also include an audio output interface that provides an audio output signal to external audio output devices, such as, for example, speakers.

The laptop computer can also include a magnetic hard disk drive for reading from and writing to a magnetic hard disk. A magnetic hard disk drive and magnetic hard disk can provide nonvolatile storage of computer-executable instructions, data structures, program modules, and other data for the laptop computer. For example, a magnetic hard disk can store one or more program modules including an operating system, application programs, and program data.

The laptop computer can be connectable to networks, such as, for example, an office-wide or enterprise-wide computer network, an intranet, and/or the Internet. The laptop computer can wirelessly exchange data with external sources, such as, for example, remote computer systems and/or remote databases over such a network. The laptop computer can include a network interface, through which the laptop computer receives data from external sources and/or transmits data to external sources.

Modules of the present invention including control modules, as well as associated data, including control data, data notification signals, location requests, location signals, location data, and program data, may be stored and accessed from any of the computer-readable media associated with telephonic device 100 (or a laptop computer). For example, portions of such modules and portions of associated program data may be included in operating system 113, application programs 114, program modules 115, and/or program data 116, for storage in system memory 112.

When a mass storage device, such as, for example, a magnetic hard disk, is coupled to telephonic device 100 (or a laptop computer), such modules and associated program data may also be stored at the mass storage device. In a networked environment, program modules depicted relative to telephonic device 100 (or a laptop computer), or portions thereof, can be stored in remote memory storage devices, such as, for example, system memory and/or mass storage devices associated with a remote computer system. Execution of such modules may be performed in a distributed environment as previously described.

Figure 2:
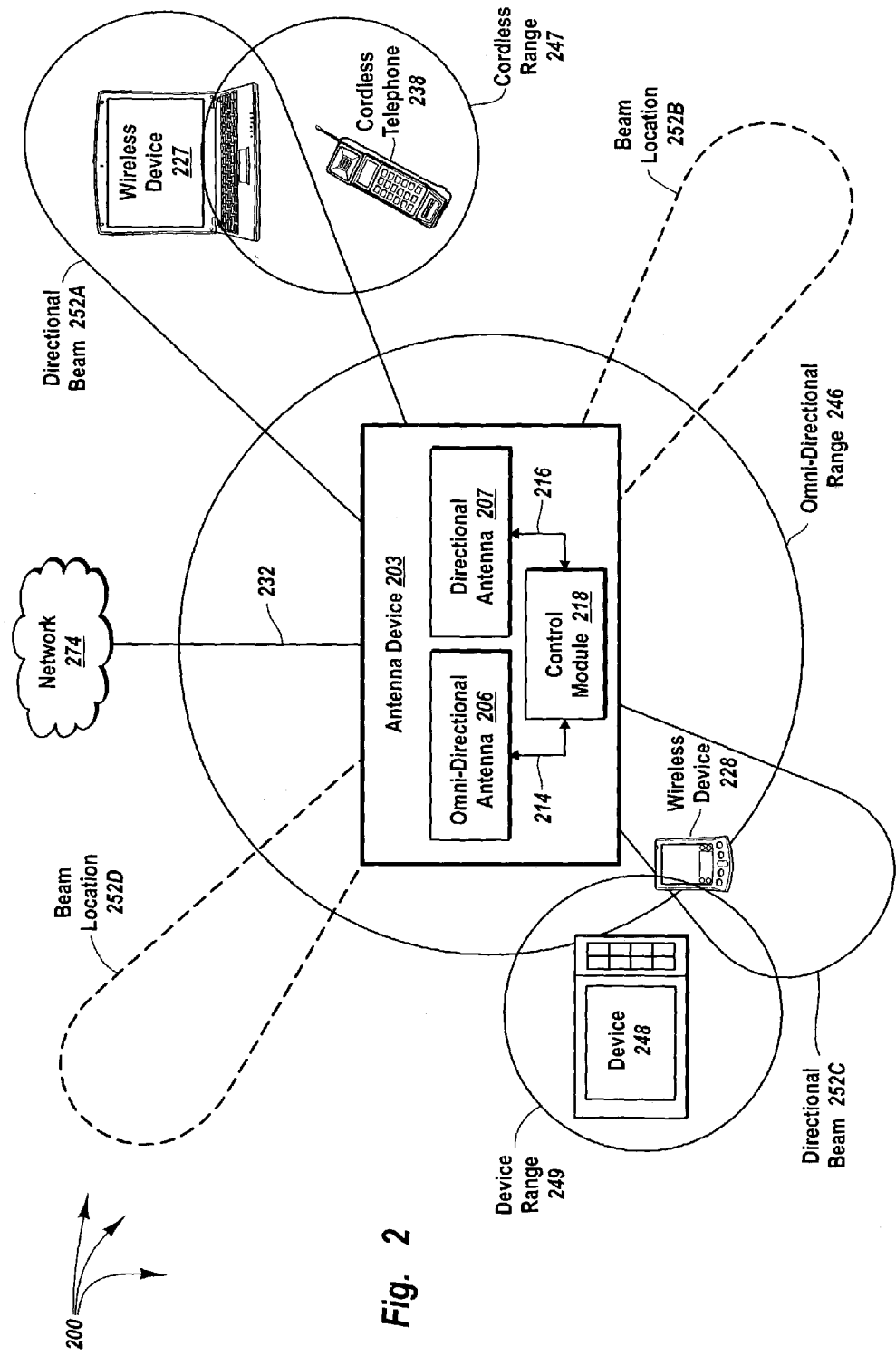
FIG. 2 illustrates an example network architecture that facilitates using a directional antenna to mitigate interference in wireless networks in accordance with the principles of the present invention.

FIG. 2 illustrates an example network architecture 200 that facilitates using directional antennas to mitigate the effects of interference in wireless networks. Depicted in network architecture 200 is antenna device 203, which may be an access point computer system or station computer system. Antenna device 203 can wirelessly communicate with wireless devices 227 and 228 (which may each also be station computer systems) over common wireless channels, such as, for example, IEEE 802.11 channels in the 2.4 GHz and/or 5 GHz frequency spectrums. Antenna device 203 is further connected to network 274 via link 232. Link 232 can be a wired or wireless link that connects antenna device 203 to other network devices, such as, for example, other access points, routers, hubs, etc., included in network 274. Network 274 can be virtually any type of network, such as, for example, a local area network, a wide area network, or even the Internet. Accordingly, antenna device 203 may provide wireless devices 227 and 228 with access to network 274.

Cordless telephone 238 and device 248 are each devices that operate in a frequency spectrum used for wireless communication between antenna device 203 and wireless devices 227 and 228. Accordingly, cordless telephone 238 and device 248 can transmit signals into the frequency spectrum used by antenna device 203 and wireless devices 227 and 228. However, cordless telephone 238 and device 248 are not configured to wirelessly communicate with antenna device 203 or wireless devices 227 or 228. Thus, cordless telephone 238 and device 248 do not implement protocols (e.g., the Distributed Coordination Function) used by antenna device 203 and wireless devices 227 and 228 for collision avoidance. Accordingly, signals transmitted by cordless telephone 238 and device 248 may interfere with wireless communication between antenna device 203, wireless device 227, and wireless device 228.

Antenna device 203 includes omni-directional antenna 206, directional antenna 207, and control module 218. Omni-directional antenna 206 has a range of omni-directional range 246. Inside omni-directional range 246, omni-directional antenna 206 may have sufficient signal strength to send and receive program data from wireless devices. On the other hand, outside of omni-directional range 246, omni-directional antenna 206 may not have sufficient signal strength to send and receive program data from wireless devices. For example, outside of omni-directional range 246, omni-directional antenna 206 may not have sufficient signal strength to sufficiently receive streaming A/V data.

However, outside of omni-directional range 246, omni-directional antenna 206 may have sufficient signal strength to send and receive control data. For example, outside of omni-directional range 246, omni-directional antenna 206 may have sufficient signal strength to receive a data notification signal. Even within omni-directional range 246, it may be that communication is degraded due to interference from interfering devices, such as, for example, cordless telephones, microwaves, BlueTooth devices, or other control devices. Thus, even within omni-directional range 246, communication can be degraded such that omni-directional antenna 206 may have sufficient signal strength to transfer control data but not have sufficient signal strength to transfer program data. It may also be that a combination of range from antenna device 203 and interference cause communication with antenna device 203 to be degraded.

Directional antenna 207 (e.g., an electronically steered phased array antenna) can include one or more feeds for directing beams at wireless devices. Beams can be directed at wireless devices that are to send program data to and/or receive program data from antenna device 203. For example, when wireless device 227 has program data to send to antenna device 203, directional beam 252A can be directed at wireless device 227. Similarly, when wireless device 228 has program data to send to antenna device 203, directional beam 252C can be directed at wireless device 228. Although antenna device 203 is depicted as having a single directional antenna (i.e., directional antenna 207), it may be that antenna device 203 includes a plurality of directional antennas. Accordingly, antenna device 203 can be configured to communicate through a plurality of directional beams from different directional antennas simultaneously.

The dashed lines representing beam locations 252B and 252D represent some of the locations where a directional beam from directional antenna 207 can be directed. However, it should be understood that the beam locations 252B and 252D are merely illustrative and that a directional beam can be directed in virtually any direction. This includes directing directional beams in directions above and/or below an antenna device to communicate with wireless devices in those locations. For example, directional antenna 207 can direct a directional beam in directions above and/or below antenna device 203 (e.g., to communicate with a wireless device on a floor above or below antenna device 203).

Omni-directional antenna 206 and directional antenna 207 are connected to control module 218 by corresponding links 214 and 216 respectively. Links 214 and 216 can be part of a system bus (e.g., bus 110) or Local Area Network ("LAN") connection. Control module 218 can send program data to and receive program data from omni-directional antenna 206 and directional antenna 207 over the corresponding links 214 and 216. Control module 218 can also send control data, such as, for example, antenna commands, to omni-directional antenna 206 and directional antenna 207 over the corresponding links 214 and 216. Antenna commands can cause the configuration of omni-directional antenna 206 and directional antenna 207 to change (e.g., to cause directional antenna 207 to direct a directional beam at a wireless device). Accordingly, control module 218 can interoperate with omni-directional antenna 206 and directional antenna 207 to implement the principles of the present invention.

For example, control module 218 can cause omni-directional antenna 206 to listen for data notification signals indicating that a wireless device has data to send to antenna device 201. When omni-directional antenna 206 receives a data notification signal, control module 218 can then cause a directional beam of directional antenna 207 to be directed towards the location of a wireless device. Further, when antenna device 203 has data to send to a wireless device, control module 218 can cause omni-directional antenna 206 to transmit a location request and listen for a corresponding location signal. Control module 218 can process a corresponding location signal and cause a directional beam to be directed towards the location of a wireless device. Control module 218 can also cause omni-directional antenna 206 and/or directional antenna 207 to measure usage of a frequency spectrum (e.g., a 2.4 GHz or 5 GHz spectrum) and to communicate on a particular channel within the frequency spectrum.

Figure 3:
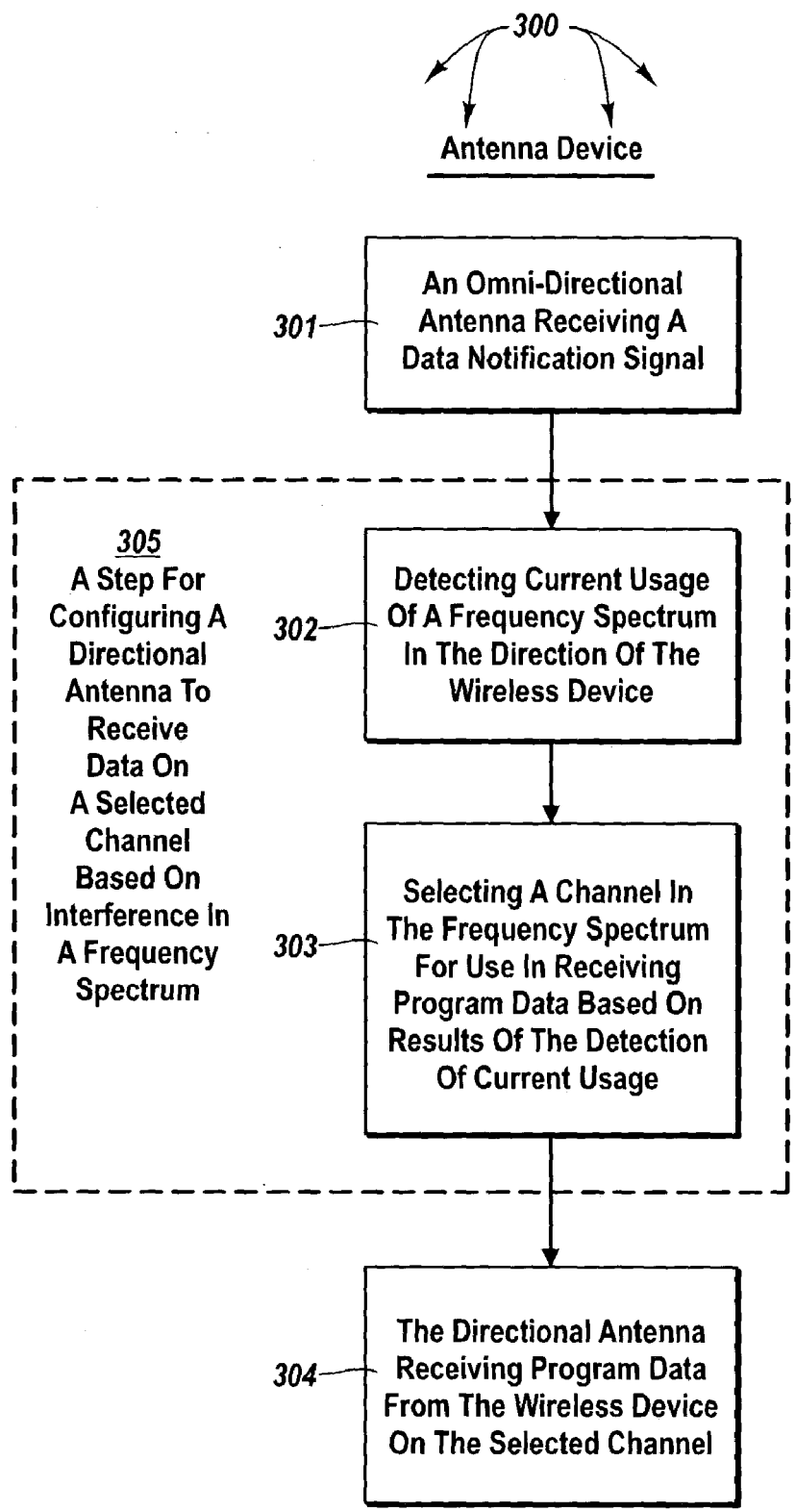
FIG. 3 illustrates an example flowchart of a method for an antenna device to receive program data in accordance with the principles of the present invention.

FIG. 3 illustrates an example flowchart of a method 300 for an antenna device to receive program data in accordance with the principles of the present invention. The method 300 will be discussed with respect to the antenna device, wireless devices, cordless telephone, and device depicted in network architecture 200.

The method 300 includes an act of an omni-directional antenna receiving a data notification signal (act 301). Act 301 can include an omni-directional antenna receiving a data notification signal from a wireless device. For example, omni-directional antenna 206 can receive a data notification signal from wireless device 227. A data notification signal can be indicative of a wireless device having program data to transmit to an antenna device. For example, a data notification signal from wireless device 227 can be indicative of wireless device 227 having program data to send to antenna device 203. A data notification signal can be one or more bytes (e.g., of a request to send ("RTS") signal) that indicate to an antenna device that the wireless device has program data to send.

The method 300 includes a functional, result-oriented step for configuring a directional antenna to receive data on a selected channel based on interference in a frequency spectrum (step 305). Step 305 can include any corresponding acts for configuring a directional antenna to receive data on a selected channel based on interference in a frequency spectrum. However, in the illustrated example of FIG. 3, step 305 includes a corresponding act of detecting current usage of a frequency spectrum in the direction of the wireless device (act 302.)

Act 302 can include the antenna device detecting current usage of a frequency spectrum in the direction of the wireless device. A received data notification signal can indicate to a control module that a wireless device has program data to send to an antenna device. In response to the received data notification signal, the control module can send antenna commands to cause an omni-directional antenna or a directional antenna (e.g., selected from among one or more directional antennas at the antenna device) to detect usage of a frequency spectrum. For example, based on an RTS signal received from wireless device 227, control module can 218 can send antenna commands to cause omni-directional antenna 206 and/or directional antenna 207 to detect usage of a frequency spectrum (e.g., a 2.4 GHz frequency spectrum or 5 GHz frequency spectrum) in the direction of the wireless device 227.

Within cordless range 247, it may be that cordless telephone 238 interferes with a portion of a frequency spectrum. For example, if cordless phone 238 operates in the 2.4 GHz frequency spectrum, cordless telephone 238 may emit noise within some portion of the 2.4 GHz frequency spectrum (e.g., in a range between 2.401 GHz and 2.473 GHz). If antenna device 203 and wireless device 227 communicate on frequencies in the 2.4 GHz frequency spectrum, noise emitted from cordless phone 238 can potentially interfere with communication between antenna device 203 and wireless device 227. For example, cordless telephone 238 may emit noise at or near a frequency 2.412 GHz (a frequency that corresponds to IEEE 802.11b channel 1) that degrades communication between antenna device 203 and wireless device 227 when they attempt to communicate on the 2.412 GHz frequency. Accordingly, antenna device 203 can detect increased usage (in the direction of wireless device 227) at or near 2.412 GHz as compared to noise detected at other frequencies in the 2.4 GHz frequency spectrum (e.g., at or near 2.437 GHz or at or near 2.462 GHz, etc).

Similarly, within device range 249, it may be that device 248 interferes with a portion of a frequency spectrum. For example, if device 248 operates in the 5 GHz frequency spectrum, device 248 may emit noise within some portion of the 5 GHz frequency spectrum (e.g., in a range between 5.17 GHz and 5.805 GHz). If antenna device 203 and wireless device 228 communicate on frequencies in the 5 GHz frequency spectrum, noise emitted from device 248 can potentially interfere with communication between antenna device 203 and wireless device 248. For example, device 248 may emit noise at or near a frequency of 5.22 GHz (a frequency that corresponds to IEEE 802.11a channel 44) that degrades communication between antenna device 203 and wireless device 227 when they attempt to communicate on the 5.22 GHz frequency. Accordingly, antenna device 203 can detect increased usage (in the direction of wireless device 228) at or near 5.22 GHz as compared to noise detected at other frequencies in the 5 GHz frequency spectrum (e.g., at or near 5.18 GHz or at or near 5.3 GHz, etc.).

Step 305 also includes a corresponding act of selecting a channel in the frequency spectrum for use in receiving program data based on results of the detection of current usage (act 303). Act 303 can include the antenna device selecting a channel in the frequency spectrum for use in receiving program data from the wireless device based on results of the detection of current usage. For example, antenna device 203 can select a channel in the 2.4 GHz frequency spectrum for use in receiving program data from wireless device 227 based on the of results of detected usage in a 2.4 GHz frequency spectrum. Similarly, antenna device 203 can select a channel in a 5 GHz frequency spectrum for use in receiving program data from wireless device 228 based on the of results of detected usage in the 5 GHz frequency spectrum.

It may be that a frequency spectrum has pre-determined channel-to-frequency mappings that map specific frequencies (e.g., central frequencies) in the frequency spectrum to specific corresponding channels. For example, IEEE 802.11b has pre-determined channel-to-frequency mappings that map specific frequencies in the 2.4 GHz spectrum to specific corresponding channels in a range from 1–11. Similarly, IEEE 802.11a defines pre-determined channel-to-frequency mappings that map specific frequencies in the 5 GHz spectrum to specific corresponding channels. Based on noise detected on each of the channels in a frequency spectrum, antenna device 203 can select an appropriate channel for communicating with a wireless device. Control module 218 can analyze detected frequency spectrum usage to at least estimate an appropriate channel for antenna device 203 to use when communicating with a wireless device. An appropriate channel may be a channel that has reduced interference in the direction of the wireless device.

For example, in the direction of wireless device 227, IEEE 802.11b channel 6 may have less interference than IEEE 802.11b channels 1 and 11. Accordingly, control module 218 may identify IEEE 802.11b channel 6 as an appropriate channel for antenna device 203 to use when communicating with wireless device 227. Similarly, in the direction of wireless device 228, IEEE 802.11a channel 44 may have less interference than IEEE 802.11a channels 36, 40 and 48. Accordingly, control module 218 may identify IEEE 802.11a channel 44 as an appropriate channel for antenna device 203 to use when communicating with wireless device 227.

When appropriate, control module 218 can cause a directional beam from directional antenna 207 to be directed at a wireless device. For example, when wireless device 227 has program data to send to antenna device 203 but no directional beam is currently directed at wireless device 227, control module 218 can cause a directional beam 252A to be directed at wireless device 227. Similarly, when wireless device 228 has program data to send to antenna device 203 but no directional beam is currently directed at wireless device 228, control module 218 can cause a directional beam 252C to be directed at wireless device 228.

The method 300 includes an act of a directional antenna receiving program data from the wireless device on the selected channel (act 304). Act 304 can include the antenna device using a directional antenna (e.g., selected from among one or more directional antennas at the antenna device) to receive program data from the wireless device on the selected channel in response to a data notification signal. For example, in response to a data notification signal from wireless device 227, antenna device 203 can receive program data on a pre-determined IEEE 802.11b channel from wireless device 227 via directional beam 252A. Similarly, in response to a data notification signal from wireless device 228, antenna device 203 can receive program data on a predetermined IEEE 802.11a channel from wireless device 228 via directional beam 252C.

Since antenna device 203 uses directional beams to communicate, a wireless channel can be selected to mitigate interference in the direction of a wireless device. Thus, communication is not limited to a channel used by omni-directional antenna 206. Further, when a new wireless device is to communicate with antenna device 203, current usage of a frequency spectrum in the direction of the new wireless device can be calculated and a new channel potentially selected. Accordingly, antenna device 203 can select channels to mitigate interface with different wireless devices based on the location of the wireless devices relative to antenna device 203.

It may be that an application in network 274 (or even at antenna device 203), such as, for example, a Web server or electronic mail server, has program data to send to a wireless device. Accordingly, the application can indicate to antenna device 203 that program data is to be sent to the wireless device. Antenna device 203 can receive the program data and subsequently forward the program data to the appropriate wireless device. For example, if a Web server indicates that a Web page is to be delivered to wireless device 228, antenna device 203 can receive the Web page and subsequently forward the Web page to wireless device 228.

Figure 4:
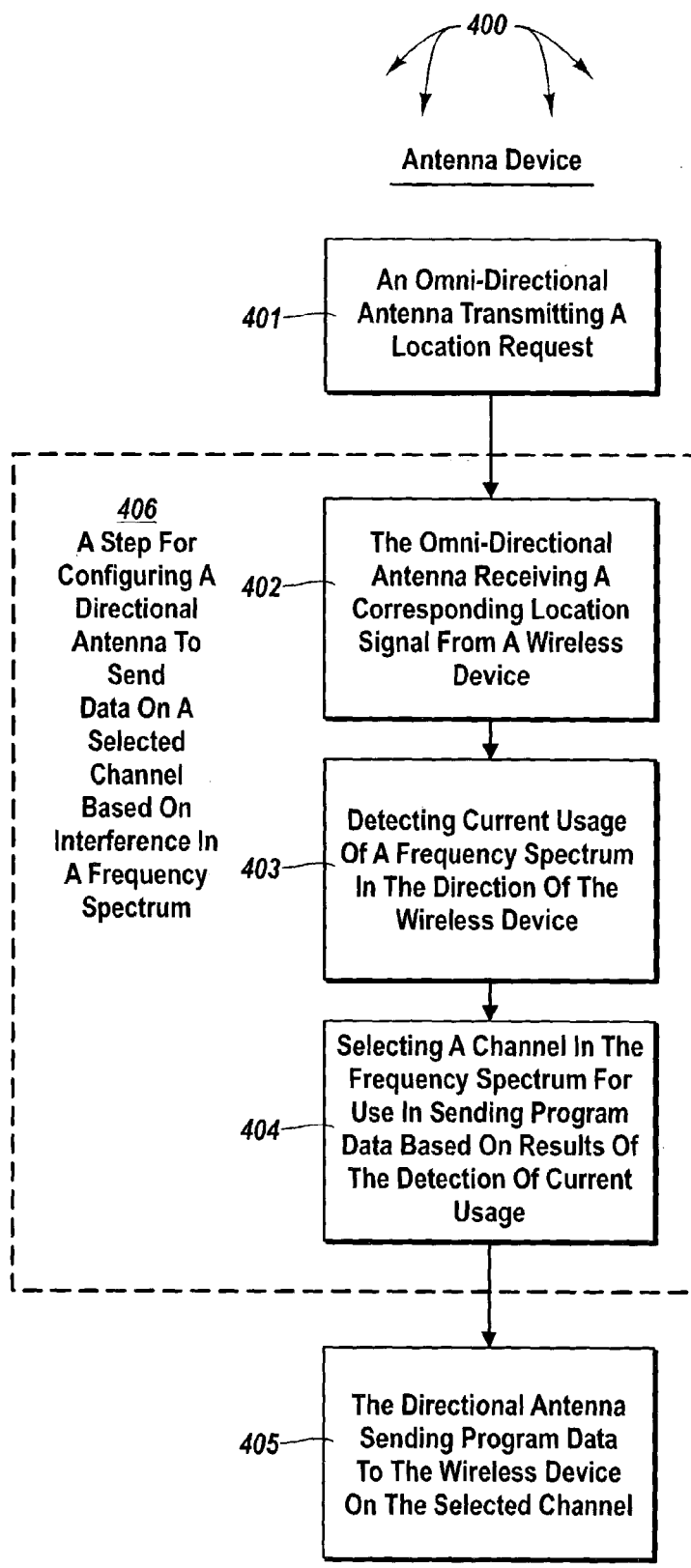
FIG. 4 illustrates an example flowchart of a method for an antenna device to send program data in accordance with the principles of the present invention.

FIG. 4 illustrates an example flowchart of a method 400 for an antenna device to send program data in accordance with the principles of the present invention. The method 400 will be discussed with respect to the antenna device, wireless devices, cordless telephone, and device oven depicted in network architecture 200. The method 400 includes an act of an omni-directional antenna transmitting a location request (act 401). Act 401 can include an omni-directional transmitting a location request that requests the location of a wireless device. For example, omni-directional antenna 206 can transmit a location request (potentially including a RTS signal) requesting the location of wireless device 227 or wireless device 228.

It may be that a wireless device does not receive a location request due to interference on a channel being used by the wireless device. For example, communication with wireless device 227 may be significantly degraded due to interference form cordless telephone 238. On the other hand, when conditions are appropriate, a wireless device may receive a location request. For example, omni-directional antenna 203 may have sufficient strength to cause a location request reach wireless device 228. Accordingly, wireless device 228 can respond to the location request by sending a location signal back to antenna device 203. For example, wireless device 228 can transmit a location signal indicating the location of wireless device 228

The method 400 includes a functional, result-oriented step for configuring a directional antenna to send data on a selected channel based on interference in a frequency spectrum (step 406). Step 406 can include any corresponding acts for configuring a directional antenna to send data on a selected channel based on interference in a frequency spectrum. However, in the illustrated example of FIG. 4, step 406 includes a corresponding act of the omni-directional antenna receiving a location signal from a wireless device (act 402). Act 402 can include the omni-directional antenna receiving a corresponding location signal that was sent from a wireless device in response to receiving the location request. For example, wireless device 228 can respond to a location request by transmitting a corresponding location signal.

The location signal may be one or more bytes (e.g., of a clear to send ("CTS") signal) that indicate to the antenna device that the wireless device can receive program data. The location signal can include location data representing the location of the wireless device relative to the antenna device. Control module 218 can process the location data to calculate the location of wireless device 228. Alternately, control module 218 may at least estimate the location of the wireless device based on the direction from which the location signal was received.

Step 406 includes a corresponding an act detecting current usage of a frequency spectrum in the direction of the wireless device (act 403). Act 403 can include the antenna device detecting current usage of a frequency spectrum in the direction of the wireless device. A received location signal can indicate to a control module that a wireless device is to receive program data form an antenna device. In response to the received location signal, the control module can send antenna commands to cause an omni-directional antenna or a directional antenna (e.g., selected from among one or more directional antennas at the antenna device) to detect usage of a frequency spectrum. For example, based on a CTS signal received from wireless device 228, control module can 218 can send antenna commands to cause omni-directional antenna 206 and/or directional antenna 207 to detect usage of a frequency spectrum (e.g., a 2.4 GHz frequency spectrum or 5 GHz frequency spectrum) in the direction of the wireless device 228.

Step 406 includes a corresponding act of selecting a channel in the frequency spectrum for use in sending program data based on results of the detection of current usage (act 404). Act 404 can include the antenna device selecting a channel in the frequency spectrum for use in sending program data to the wireless device based on results of the detection of current usage. For example, antenna device 203 can select a channel in a 2.4 GHz frequency spectrum for use in sending program data to wireless device 227 based on the of results of detected usage in the 2.4 GHz frequency spectrum. Similarly, antenna device 203 can select a channel in a 5 GHz frequency spectrum for use in sending program data to wireless device 228 based on the of results of detected usage in the 5 GHz frequency spectrum.

When appropriate, control module 218 can cause a directional beam from directional antenna 207 to be directed at a wireless device. When wireless device 228 is to receive program data from antenna device 203 but no directional beam is currently directed at wireless device 228, control module 218 can cause a directional beam 252C to be directed at wireless device 228. The method 400 includes an act of sending program data to the wireless device on the selected channel (act 405). Act 405 can include the antenna device using a directional antenna (e.g., selected from among one or more directional antennas at the antenna device) to send program data to the wireless device on the selected channel in response to having received the location signal. For example, in response to a location signal from wireless device 227, antenna device 203 can send program data on a pre-determined IEEE 802.11b channel to wireless device 227 via directional beam 252A. Similarly, in response to a location signal from wireless device 228, antenna device 203 can send program data on a pre-determined IEEE 802.111a channel to wireless device 228 via directional beam 252C.

In some embodiments, antenna device 203 is a multi-mode access point computer system. That is, antenna device 203 can communicate with wireless devices in a plurality of different frequency spectrums simultaneously. Accordingly, different directional beams can be used to communicate with wireless devices in each different frequency spectrum. For example in FIG. 2, directional beam 252A may be used for communication in a 2.4 GHz frequency spectrum and directional beam 252C may be used for communication in a 5 GHz frequency spectrum. Accordingly, antenna device 203 can be configured to simultaneously communicate with a plurality of wireless devices, even when some wireless devices communicate in a first frequency spectrum and other wireless devices communicate in a second different frequency spectrum. When appropriate, antenna device 203 can include a different directional antenna for each different frequency spectrum.

Embodiments of the present invention have been described with express reference to particular frequency spectrums. However, it should be understood that the present invention is not limited those expressly referenced frequency spectrums. It would be apparent to one skilled in the art, after having reviewed this description, that the present invention can be practiced in virtually any frequency spectrum, in addition to those frequency spectrums that have been expressly referenced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed as new and desired by Letters Patent of the United States is:

1. In an antenna device that includes an omni-directional antenna and at least one directional antenna, the omni-directional antenna and the at least one directional antenna utilizing a specified frequency spectrum to facilitate communication with other wireless devices on a wireless network, a method for mitigating interference associated with the wireless reception of program data via the wireless network, the method comprising the following:

an act of the omni-directional antenna receiving a data notification signal from a wireless device configured for wireless communication in the specified frequency spectrum on the wireless network, the data notification signal being indicative of the wireless device having program data to send to the antenna device over the wireless network;

an act of causing a directional beam of a directional antenna to be directed towards the location of the wireless device in response to the omni-directional antenna receiving the data notification signal from the wireless device such that reception of program data from the wireless device is transitioned from the omni-directional antenna to the directional antenna;

an act of the antenna device detecting usage across different portions of the specified frequency spectrum in the direction of the wireless device in response to the omni-directional antenna receiving the data notification signal from the wireless device;

an act of the antenna device identifying a portion of the specified frequency spectrum having reduced usage relative to other portions of the specified frequency spectrum in the direction of the wireless device;

an act of the antenna device tuning the directional beam of the directional antenna to the identified portion of the specified frequency spectrum to configure the antenna device to mitigate degrading communication effects of interference in the direction of the wireless device; and an act of the antenna device using the tuned directional beam of the directional antennae to receive program data from the wireless device over the identified portion of the specified frequency spectrum in response to the omni-directional antenna having received the data notification signal from the wireless device.

2. The method as recited in claim 1, wherein the act of the omni-directional antenna receiving a data notification signal from the wireless device comprises an act of the omni-directional antenna receiving a ready to send signal.

3. The method as recited in claim 1, wherein the act of the antenna device detecting current usage of the specified frequency spectrum in the direction of the wireless device comprises an act of detecting frequency usage in a 2.4 GHz frequency spectrum.

4. The method as recited in claim 1, wherein the act of the antenna device detecting current usage of the specified frequency spectrum in the direction of the wireless device comprises an act of detecting frequency usage in a 5 GHz frequency spectrum.

5. The method as recited in claim 1, wherein the act of the antenna device detecting current usage of the specified frequency spectrum in the direction of the wireless device comprises an act of the omni-directional antenna detecting usage of the specified frequency spectrum in the direction of the wireless device.

6. The method as recited in claim 1, wherein the act of the antenna device detecting current usage of the specified frequency spectrum in the direction of the wireless device comprises an act of the directional antennae detecting usage of the specified frequency spectrum in the direction of the wireless device.

7. The method as recited in claim 1, wherein the act of the antenna device detecting current usage of the specified frequency spectrum in the direction of the wireless device comprises an act of the detecting frequency spectrum usage that could potentially interfere with the antenna device sufficiently receiving the program data from the wireless device.

8. The method as recited in claim 1, wherein the act of the antenna device identifying a portion of the specified frequency spectrum in the direction of the wireless device comprises an act of selecting a channel that is mapped to the identified frequency in the specified frequency spectrum.

9. The method as recited in claim 8, wherein the act of selecting a channel that is mapped to the identified frequency in the specified frequency spectrum comprises an act of selecting a channel that is mapped to a specified frequency in a 2.4 GHz frequency spectrum.

10. The method as recited in claim 8, wherein the act of selecting a channel that is mapped to the identified frequency in the specified frequency spectrum comprises an act of selecting a channel that is mapped to a specified frequency in a 5 GHz frequency spectrum.

11. The method as recited in claim 1, wherein the act of the antenna device identifying a portion of the specified frequency spectrum in the direction of the wireless device comprises an act of selecting a channel that has reduced interference in the direction of the wireless device.

12. The method as recited in claim 1, wherein the act of the antenna device using the tuned directional beam of the directional antennas to receive program data from the wireless device over the identified portion of the specified frequency spectrum comprises an act of receiving program data that was transported in accordance with the Internet Protocol.

13. The method as recited in claim 1, wherein the act of the antenna device using the tuned directional beam of the directional antennas to receive program data from the wireless device over the identified portion of the specified frequency spectrum comprises an act of using an electronically steered phased array antenna to receive program data from the wireless device over the identified portion of the specified frequency spectrum.

14. The method as recited in claim 1, further comprising:
an act of the antenna device simultaneously using another of the at least one directional antennas to communicate with a second wireless device over a second different portion of the specified frequency spectrum during reception of the program data from the wireless device over the identified portion of the specified frequency spectrum.

15. The method as recited in claim 1, wherein the act of the antenna device detecting current usage of the specified frequency spectrum in the direction of the wireless device comprises an act of the omni-directional antenna and the directional antenna together detecting usage of the specified frequency spectrum in the direction of the wireless device.

16. The method as recited in claim 1, wherein the act of the antenna device detecting current usage of the specified frequency spectrum in the direction of the wireless device comprises an act of the detecting noise emissions from non-communicative interfering devices that do not implement protocols the antenna device and the wireless device use for communicating on the wireless network.

17. The method as recited in claim 1, wherein the act of the antenna device identifying a portion of the specified frequency spectrum in the direction of the wireless device comprises an act of identifying portion of the specified frequency spectrum based on the detected noise emitted into different portions of the specified frequency spectrum from non-communicative interfering devices, the selected portion of the specified frequency spectrum being selected to mitigate communication degradation due to non-communicative interfering devices in the direction of the wireless device.

18. The method as recited in claim 1, wherein the act of causing a directional beam of a directional antenna to be directed towards the location of the wireless device in response to the omni-directional antenna receiving the data notification signal comprises an act of detecting that the omni-directional antenna has does not have sufficient signal strength to receive program data from the wireless device.

19. In an antenna device that includes an omni-directional antenna and at least one directional antenna, the omni-directional antenna and the at least one directional antenna utilizing a specified frequency spectrum to facilitate communication with other wireless devices on a wireless network, a method for mitigating interference associated with the wireless reception of program data via the wireless network, the method comprising the following:

an act of the omni-directional antenna receiving a data notification signal from a wireless device configured for wireless communication in the specified frequency spectrum on the wireless network, the data notification signal being indicative of the wireless device having program data to send to the antenna device over the wireless network;

an act of causing a directional beam of a directional antenna to be directed towards the location of the wireless device in response to the omni-directional antenna receiving the data notification signal from the wireless device such that reception of program data from the wireless device is transitioned from the omni-directional antenna to the directional antenna;

a step for configuring the directional antennae to receive data on an identified portion of the specified frequency spectrum based on interference in the specified frequency spectrum, the identified portion of the specified frequency spectrum having reduced interference as compared to at least one other portion of the specified frequency spectrum;

an act of the antenna device tuning the directional beam of the directional antenna to the identified portion of the specified frequency spectrum to configure the antenna device to mitigate degrading communication effects of interference in the direction of the wireless device; and an act of the antenna device using the tuned directional beam of the directional antennae to receive program data from the wireless device over the identified portion of the specified frequency spectrum in response to the omni-directional antenna having received the data notification signal from the wireless device.

20. The method as recited in claim 19, wherein the act of the antenna device using tuned directional beam of the directional antennae to send program data to the wireless device over the identified portion of the specified frequency spectrum comprises an act of sending program data that is to be transported in accordance with the Internet Protocol.

21. The method as recited in claim 19, wherein the act of the antenna device using tuned directional beam of the directional antenna to send program data to the wireless device over the identified portion of the specified frequency spectrum comprises an act using an electronically steered phased array antenna to send program data to the wireless device over the identified portion of the specified frequency spectrum.

22. In an antenna device that includes an omni-directional antenna and at least one directional antenna, the omni-directional antenna and the at least one directional antenna utilizing a specified frequency spectrum to facilitate communication with other wireless devices on a wireless network, a method for mitigating interference associated with the wireless transmission of data via the wireless network, the method comprising the following:

an act of the omni-directional antenna transmitting a location request, the location request requesting the location of a wireless device configured for communication in the specified frequency spectrum on the wireless network;

an act of the omni-directional antenna receiving a location signal from the wireless device, the location signal indicating the location of the wireless device;

an act of causing a directional beam of a directional antenna to be directed towards the location of the wireless device in response to the omni-directional antenna receiving the location signal from the wireless device such that transmission of further data to the wireless device is transitioned from the omni-directional antenna to the directional antenna;

an act of the antenna device detecting usage across different portions of the specified frequency spectrum in the direction of the wireless device in response to the omni-directional antenna receiving the location signal from the wireless device;

an act of the antenna device identifying a portion of the specified frequency spectrum having reduced usage relative to other portions of the specified frequency spectrum in the direction of the wireless device;

an act of the antenna device tuning the directional beam of the directional antenna to the identified portion of the specified frequency spectrum to configure the antenna device to mitigate degrading communication effects of interference in the direction of the wireless device; and an act of the antenna device using the tuned directional beam of the directional antennae to send program data to the wireless device over the identified portion of the specified frequency spectrum in response to the omni-directional antenna having received the location signal from the wireless device.

23. The method as recited in claim 22, further comprising:
an act of receiving an indication that an application has program data to send to the wireless device.

24. The method as recited in claim 22, wherein the act of the omni-directional antenna receiving a location signal from the wireless device comprises an act of the omni-directional antenna receiving a clear to send signal.

25. The method as recited in claim 22, wherein the act of the omni-directional antenna receiving a location signal from the wireless device comprises an act of the omni-directional antenna receiving location data indicating the location of the wireless device.

26. The method as recited in claim 22, wherein the act of the antenna device detecting usage across different portions of the specified frequency spectrum in the direction of the wireless device comprises an act of detecting frequency usage in a 2.4 GHz frequency spectrum.

27. The method as recited in claim 22, wherein the act of the antenna device detecting usage across different portions of the specified frequency spectrum in the direction of the wireless device comprises an act of detecting frequency usage in a 5 GHz frequency spectrum.

28. The method as recited in claim 22, wherein the act of the antenna device detecting usage across different portions of the specified frequency spectrum in the direction of the wireless device comprises an act of the omni-directional antenna detecting usage of the specified frequency spectrum.

29. The method as recited in claim 22, wherein the act of the antenna device detecting usage across different portions of the specified frequency spectrum in the direction of the wireless device comprises an act of the directional antennae detecting usage of the specified frequency spectrum.

30. The method as recited in claim 22, wherein the act of the antenna device detecting usage across different portions of the specified frequency spectrum in the direction of the wireless device comprises an act of detecting frequency spectrum usage that could potentially interfere with the antenna device sending the program data to the wireless device.

31. The method as recited in claim 22, wherein the act of the antenna device identifying a in portion of the specified frequency spectrum for use in sending program data to the wireless device comprises an act of selecting a channel that is mapped to the identified frequency in the specified frequency spectrum.

32. The method as recited in claim 31, wherein the act of selecting a channel that is mapped to the identified frequency in the specified frequency spectrum comprises an act of selecting a channel that is mapped to a specified frequency in a 2.4 GHz frequency spectrum.

33. The method as recited in claim 31, wherein the act of selecting a channel that is mapped to the identified frequency in the specified frequency spectrum comprises an act of selecting a channel that is mapped to a specified frequency in a 5 GHz frequency spectrum.

34. The method as recited in claim 22, wherein the act of the antenna device identifying a portion of the specified frequency spectrum for use in sending program data to the wireless device comprises an act of selecting a channel that has reduced interference in the direction of the wireless device.

35. In an antenna device that includes an omni-directional antenna and at least one directional antenna, the omni-directional antenna and the at least one directional antenna utilizing a specified frequency spectrum to facilitate communication with other wireless devices on a wireless network, a method for mitigating interference associated with the wireless transmission of data via the wireless network, the method comprising the following:
  an act of the omni-directional antenna transmitting a location request, the location request requesting the location of wireless device configured for communication in the specified frequency spectrum on the wireless network;
  a step for configuring a directional antennae to send program data on an identified portion of a specified frequency spectrum based on interference in the specified frequency spectrum, the portion of the specified frequency spectrum having reduced interference as compared to at least one other portion of the specified frequency spectrum;
  an act of the antenna device tuning the directional beam of the directional antenna to the identified portion of the specified frequency spectrum to configure the antenna device to mitigate degrading communication effects of interference in the direction of the wireless device; and
  an act of the antenna device using the tuned directional beam of the directional antennae to send program data to the wireless device over the identified portion of the specified frequency spectrum in response to the omni-directional antenna having received a location signal from the wireless device.

36. A computer program product for use in an antenna device that includes an omni-directional antenna and at least one directional antenna, the omni-directional antenna and the at least one directional antenna utilizing a specified frequency spectrum to facilitate communication with other wireless devices on a wireless network, the computer program product for implementing a method for mitigating interference associated with the wireless reception of program data via the wireless network, the computer program product comprising one or more computer-readable media having stored thereon computer executable instructions that, when executed by a processor, cause the antenna device to perform the following:
  the omni-directional antenna receiving a data notification signal from a wireless device configured for wireless communication in the specified frequency spectrum on the wireless network, the data notification signal being indicative of the wireless device having program data to send to the antenna device over the wireless network;
  causing a directional beam of a directional antenna to be directed towards the location of the wireless device in response to the omni-directional antenna receiving the data notification signal from the wireless device such that reception of program data from the wireless device is transitioned from the omni-directional antenna to the directional antenna; detect usage across different portions of the specified frequency spectrum in the direction of the wireless device in response to the omni-directional antenna receiving the data notification signal from the wireless device;
  identify a portion of the specified frequency spectrum having reduced usage relative to other portions of the specified frequency spectrum in the direction of the wireless device;
  tune the directional beam of the directional antenna to the identified portion of the specified frequency spectrum to configure the antenna device to mitigate degrading communication effects of interference in the direction of the wireless device; and
  use the tuned directional beam of the directional antenna to receive program data from the wireless device over the identified portion of the specified frequency spectrum in response to the omni-directional antenna having received the data notification signal from the wireless device.

37. The computer program product as recited in claim 36, wherein the one or more computer-readable media are physical media.

38. The computer program product as recited in claim 36, wherein the one or more computer-readable media include system memory.

39. A computer program product for use in an antenna device that includes an omni-directional antenna and at least one directional antenna, the omni-directional antenna and the at least one directional antenna utilizing a specified frequency spectrum to facilitate communication with other wireless devices on a wireless network, the computer program product for implementing a method for mitigating interference associated with the wireless transmission of data via the wireless network, the computer program product comprising one or more computer-readable media having stored thereon computer executable instructions that, when executed by a processor, cause the antenna device to perform the following:
  the omni-directional antenna transmitting a location request, the location request requesting the location of a wireless device configured for communication in the specified frequency spectrum on the wireless network;
  the omni-directional antenna receive a location signal from the wireless device, the location signal indicating the location of the wireless device;
  cause a directional beam of a directional antenna to be directed towards the location of the wireless device in response to the omni-directional antenna receiving the location signal from the wireless device such that transmission of further data to the wireless device is transitioned from the omni-directional antenna to the directional antenna;
  detect usage across different portions of the specified frequency spectrum in the direction of the wireless device in response to the omni-directional antenna receiving the location signal from the wireless device;
  identify a portion of the specified frequency spectrum having reduced usage relative to other portions of the specified frequency spectrum in the direction of to the wireless device;
  tune the directional beam of the directional antenna to the identified portion of the specified frequency spectrum to configure the antenna device to mitigate degrading communication effects of interference in the direction of the wireless device; and
  use the tuned directional beam of the directional antenna to send program data to the wireless device over the identified portion of the specified frequency spectrum in response to the omni-directional antenna having received the location signal from the wireless device.

40. The computer program product as recited in claim 39, wherein the one or more computer-readable media are physical media.

41. The computer program product as recited in claim 39, wherein the one or more computer-readable media include system memory.

42. An antenna device configured to wirelessly communicate with wireless devices comprising the following:
- an omni-directional antenna;
- one or more directional antennas, each directional antenna having one or more feeds for directing beams at wireless devices;
- one or more processing units; and
- one or more computer-readable media having stored thereon a control module, the control module being configured to:
    - exchange control data with the omni-directional antenna, the control data indicating that a wireless device is to exchange program data with the antenna device;
    - cause a directional beam of a directional antenna to be directed towards the location of the wireless device in response to the omni-directional antenna receiving the control data from the wireless device such that exchange of further data between the antenna device and the wireless device is transitioned from the omni-directional antenna to the directional antenna;
    - detect usage across different portions of the specified frequency spectrum in the direction of the wireless device in response to the omni-directional antenna receiving the control data from the wireless device;
    - identify a portion of the specified frequency spectrum having reduced usage relative to other portions of the specified frequency spectrum in the direction of to the wireless device;
    - tune the directional beam of the directional antenna to the identified portion of the specified frequency spectrum to configure the antenna device to mitigate degrading communication effects of interference in the direction of the wireless device; and
    - use the tuned directional beam of the directional antenna to exchanged program data with the wireless device over the identified portion of the specified frequency spectrum in response to the the omni-directional antenna having received the control data.

* * * * *